US006984746B2

(12) United States Patent
Lund et al.

(10) Patent No.: US 6,984,746 B2
(45) Date of Patent: Jan. 10, 2006

(54) METHOD FOR THE PRODUCTION OF α-ALANE

(75) Inventors: Gary K. Lund, Malad, ID (US); Jami M. Hanks, Logan, UT (US); Harold E. Johnston, Brigham City, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 10/947,078

(22) Filed: Sep. 22, 2004

(65) Prior Publication Data

US 2005/0222445 A1    Oct. 6, 2005

Related U.S. Application Data

(60) Provisional application No. 60/559,588, filed on Apr. 5, 2004.

(51) Int. Cl.
*C07F 5/06* (2006.01)
*C01B 6/00* (2006.01)
*C10L 1/12* (2006.01)

(52) U.S. Cl. ............... 556/170; 423/265; 423/274; 423/645; 44/354; 44/500

(58) Field of Classification Search ........... 556/170; 423/265, 274, 645; 44/354, 500
See application file for complete search history.

(56) References Cited

U.S. PATENT DOCUMENTS

| 3,810,974 A | 5/1974 | King |
| 3,819,335 A | 6/1974 | Daniels et al. |
| 3,819,819 A | 6/1974 | Matzek |
| 3,844,854 A | 10/1974 | Self et al. |
| 3,869,544 A | 3/1975 | Niles et al. |
| 4,048,087 A | 9/1977 | Daniels et al. |
| 5,565,183 A | 10/1996 | Knott |
| 6,228,338 B1 | 5/2001 | Petrie et al. |
| 6,617,064 B2 * | 9/2003 | Petrie et al. .............. 429/12 |

OTHER PUBLICATIONS

Brower et al., Preparation and Properties of Aluminium Hydride, Journal of the American Chemical Society, Apr. 28, 1976, pps 2450-2453, 98:9, Midland Michigan.
Konovalov et al., High Pressures in the Chemistry of Beryllium and Aluminium Hydrides, Russian Journal of Inorganic Chemistry vol. 37 (12) 1992, pps 1361-1356, Lomonosov Moscow State University.
PCT International Search Report dated Mar. 14, 2005.

* cited by examiner

*Primary Examiner*—Porfirio Nazario-Gonzalez
(74) *Attorney, Agent, or Firm*—TraskBritt, PC

(57) ABSTRACT

A method of forming α-alane. The method includes reacting aluminum trichloride and an alkali metal hydride to form an alane-ether complex solution. An aqueous ether solution is optionally added to the alane-ether complex solution to form a partially hydrolyzed ether/alane-ether complex solution. A solution of a crystallization additive is added to the alane-ether complex solution or to the aqueous ether/alane-ether complex solution to form a crystallization solution. The crystallization additive is selected from the group consisting of squalene, cyclododecatriene, norbornylene, norbornadiene, a phenyl terminated polybutadiene, 2,4-dimethyl anisole, 3,5-dimethyl anisole, 2,6-dimethyl anisole, polydimethyl siloxane, and mixtures thereof. Ether is removed from the crystallization solution to crystallize the α-alane.

22 Claims, No Drawings

METHOD FOR THE PRODUCTION OF α-ALANE

CROSS-REFERENCE TO RELATED APPLICATIONS

This application claims the benefit of U.S. Provisional Patent Application Ser. No. 60/559,588, filed Apr. 5, 2004, for METHOD FOR THE SYNTHESIS OF α-ALANE.

STATEMENT REGARDING FEDERALLY SPONSORED RESEARCH

The U.S. Government has a paid-up license in this invention and the right in limited circumstances to require the patent owner to license others on reasonable terms as provided for by the terms of Contract No. N00014-02-C-0282.

FIELD OF THE INVENTION

The present invention relates to a method of producing alane. More specifically, the present invention relates to a method of producing an alpha polymorph of the alane that utilizes a crystallization additive and, optionally, water, but that does not use borohydride salts.

BACKGROUND OF THE INVENTION

Aluminum hydride ("$AlH_3$") or alane is formed as numerous polymorphs: the alpha ("α"), alpha prime ("α'"), beta ("β"), delta ("δ"), epsilon ("ε"), zeta ("ζ"), or gamma ("γ") polymorphs. Each of the polymorphs has different physical properties and varying stability. As disclosed in U.S. Pat. No. 6,228,338 to Petrie et al. ("Petrie") and Brower et al. ("Brower"), "Preparation and Properties of Aluminum Hydride," J. Am. Chem. Soc., 98(9):2450–2453 (1976), α-alane is the most thermally stable polymorph and its crystals have a cubic or rhombohedral morphology. In contrast, α'-alane forms needlelike crystals and γ-alane forms a bundle of fused needles. γ-alane is produced with the β polymorph, both of which convert to α-alane upon heating. δ-alane and ε-alane are formed when trace amounts of water are present during crystallization. ζ-alane is prepared by crystallization from di-n-propyl ether. The α', δ, ε, and ζ polymorphs do not convert to α-alane and are less thermally stable than α-alane. Therefore, the α', δ, ε, and ζ polymorphs are typically not used in explosive or pyrotechnic compositions.

Alane includes about 10% hydrogen by weight and has a higher density of hydrogen than liquid hydrogen. Due to the high hydrogen density and highly exothermic combustion of aluminum and hydrogen, alane is commonly used as a fuel for propellants or as an explosive. When used in a propellant, the alane provides an increased specific impulse compared to propellants that use aluminum alone.

As disclosed in Petrie and Brower, α-alane is typically synthesized by reacting aluminum trichloride ("$AlCl_3$") and lithium aluminum hydride ("LAH") in diethyl ether. The aluminum trichloride is dissolved in diethyl ether at −10° C. A minimum of three mole equivalents of LAH is added to the aluminum trichloride solution to produce a solvated alane-ether complex and a precipitate of lithium chloride ("LiCl"). To desolvate the alane-ether complex, 0.5–4 mole equivalents of a borohydride salt, such as lithium borohydride or sodium borohydride, is mixed with the solution including the alane-ether complex. The mixture is filtered and the filtrate is diluted with toluene or benzene to provide an ether to toluene or benzene ratio of 15:85. The mixture is heated to 85° C.–95° C. to desolvate the alane-ether complex and the diethyl ether is subsequently removed by distillation. The precipitated alane is recovered by aqueous acid quenching, filtration, and washing. Brower also discloses that the reaction is conducted in the absence of water, oxygen, and other reactive species because if water is present, the δ and ε polymorphs are undesirably formed.

However, the borohydride salts used to desolvate the alane-ether complex are expensive and are not recovered, making this synthesis of α-alane expensive. The borohydride salts also generate byproducts that require disposal. Furthermore, the alane produced by the method of Petrie or Brower is typically contaminated with undesirable polymorphs and is prone to decomposition during heating. More importantly, since the α-alane is contaminated with the other alane polymorphs, this method of producing α-alane gives variable and irreproducible results.

Alane may also be synthesized from aluminum and hydrogen at a high pressure (0.5–6.5 GPa) and temperature (100° C.–700° C.), as disclosed in Konovalov et al., "High Pressures in the Chemistry of Beryllium and Aluminum Hydrides," Russian J. Inorg. Chem., 37(12):1361–1365 (1992). However, preparative quantities of the alane are not produced by this synthesis due to the difficulty of creating gas holders for the hydrogen.

It would be desirable to reproducibly produce a high yield of α-alane using a low-cost synthetic method.

BRIEF SUMMARY OF THE INVENTION

The present invention relates to a method of producing α-alane. The method comprises reacting aluminum trichloride and an alkali metal hydride to form an alane-ether complex solution. The aluminum trichloride and the alkali metal hydride may be reacted in diethyl ether or in a mixed solvent system comprising greater than approximately 50% diethyl ether. An aqueous ether solution is added to the alane-ether complex solution to form a partially hydrolyzed ether/alane-ether complex solution. The aqueous ether solution may include from approximately 0.5% by volume to approximately 4% by volume of water. The partially hydrolyzed ether/alane-ether complex solution is combined with a solution that comprises at least one crystallization additive to form a crystallization solution. The crystallization additive may be selected from the group consisting of squalene, cyclododecatriene, norbornylene, norbornadiene, a phenyl terminated polybutadiene, 2,4-dimethyl anisole, 3,5-dimethyl anisole, 2,6-dimethyl anisole, polydimethyl siloxane, and mixtures thereof. The crystallization solution is formulated to be substantially free of an alkali metal borohydride.

The α-alane is crystallized from the crystallization solution by removing ether from the crystallization solution. The ether may be removed by heating the crystallization solution to a temperature ranging from approximately 80° C. to approximately 87° C. to reduce a volume of ether in the crystallization solution to less than approximately 10% by volume. Additional ether may be added to the crystallization solution and heated to a temperature ranging from approximately 88° C. to approximately 95° C. to produce the α-alane. The α-alane may be exposed to an acidic solution comprising from approximately 10% by volume to approximately 12% by volume of hydrochloric acid ("HCl") to remove impurities. The α-alane is produced without using alkali metal borohydride salts.

The present invention also relates to a method of producing α-alane that comprises reacting aluminum trichloride and an alkali metal hydride to form an alane-ether complex solution. The alane-ether complex solution is combined with a solution that comprises at least one crystallization additive to form a crystallization solution. The at least one crystallization additive is selected from the group consisting of squalene, cyclododecatriene, norbornylene, norbornadiene, polydimethyl siloxane, and mixtures thereof. α-alane is crystallized from the crystallization solution.

DETAILED DESCRIPTION OF THE INVENTION

A method of producing α-alane is disclosed. The α-alane may be synthesized and crystallized without using borohydride salts, such as lithium borohydride or sodium borohydride. At least one crystallization additive may be utilized in producing the α-alane. In addition, water may optionally be used to produce the α-alane. The alane produced by the method of the present invention may be substantially the a polymorph and may be produced in a high yield. As such, the α-alane has good stability and is unreactive to hydrolysis. As used herein, the term "alane" refers to $AlH_3$ and includes combinations of the different alane polymorphs. In contrast, when referring to a specific polymorph of the alane, the designation of the specific polymorph is used, such as "α-alane" or the "α polymorph."

To synthesize the alane, aluminum trichloride and an alkali metal hydride may be reacted in solution to produce an alane-ether complex ("$AlH_3 \cdot Et_2O$") and an alkali metal chloride. As used herein, the term "alane-ether complex" refers to an etherate or ether adduct of the alane. The aluminum trichloride and the alkali metal hydride may be reacted in a first organic solvent in which both the aluminum trichloride and the alkali metal hydride are soluble. The first organic solvent may be an aliphatic ether, such as diethyl ether ("ether"), di-n-propyl ether, di-n-butyl ether, methyl-butyl ether, methyl-t-butyl ether, or mixtures thereof. Mixed solvent systems, such as a mixture of diethyl ether and toluene, may also be used as the first organic solvent. The reaction of the aluminum trichloride and the alkali metal hydride may be conducted at a temperature of less than approximately 10° C., such as from approximately −5° C. to approximately −15° C.

The alkali metal hydride may be lithium hydride, sodium hydride, potassium hydride, calcium hydride, magnesium hydride, LAH, sodium aluminum hydride, and mixtures thereof. In one embodiment, the alkali metal hydride is LAH and the alkali metal chloride formed by the reaction is lithium chloride, as shown in Equation 1:

  (Equation 1).

The reaction may also proceed through a chloroalane intermediate, such as $AlHCl_2$ or $AlH_2Cl$, which is reacted with additional amounts of the alkali metal hydride to form the alane-ether complex. To react substantially all of the aluminum trichloride with the alkali metal hydride to produce the alane-ether complex, the alkali metal hydride may be present in excess. For instance, the alkali metal hydride may be present, relative to the aluminum trichloride, in a molar ratio ranging from approximately 3:1 to approximately 5:1. The alkali metal chloride, which is lithium chloride in the embodiment shown in Equation 1, precipitates and may be filtered from the alane-ether complex solution, leaving the alane-ether complex dissolved or suspended in the first organic solvent. As shown in Equation 2 and described in detail below, the ether in the alane-ether complex solution may be removed to produce the α polymorph:

  (Equation 2).

The resulting α-alane is polymeric and its crystals have a cubic or rhombohedral appearance.

After reacting the aluminum trichloride and the alkali metal hydride, an aqueous ether solution may optionally be added to the alane-ether complex solution to form a partially hydrolyzed ether/alane-ether complex solution. The water in the aqueous ether solution is believed to result in partial hydrolysis of the alane-ether complex, resulting in the formation of polymeric aluminum-oxo-hydrido species (e.g. $(AlH_{3-n}O_n)_x$, where x>1). The aqueous ether solution may be a solution of diethyl ether that is saturated with water. The aqueous ether solution may include from approximately 0.5% by volume to approximately 4% by volume of water. As such, the water may be present in the alane-ether complex solution at less than approximately 0.1 equivalent based on the aluminum. A total amount of water added to the alane-ether complex solution may range from approximately 0.1 mole % to approximately 10 mole % of the alane present as the alane-ether complex. The small amount of water added to the alane-ether complex solution may improve product quality and reproducibility of the synthesis. In addition to providing the water in the aqueous ether solution, the appropriate amount of water may be introduced by adding a hydrated salt, such as hydrated sodium sulfate, to the alane-ether complex solution. The partially hydrolyzed ether/alane-ether complex solution may be filtered to remove any particulates, forming a solution or suspension of the alane-ether complex in the ether.

Before crystallizing the α polymorph, the partially hydrolyzed ether/alane-ether complex solution may be diluted into a second organic solvent, such as toluene, mesitylene, or xylene, to provide maximum solubility for the alane. Alternatively, paraffinic hydrocarbons, such as cyclohexane, heptane, cyclopentane, or mixtures thereof, may be used as the second organic solvent. If the aqueous ether solution is not used, the alane-ether complex solution may be diluted into the second organic solvent. In one embodiment, the second organic solvent is toluene. A crystallization additive may be present in the second organic solvent from approximately 0.05% by weight ("wt %") to approximately 5 wt %. The crystallization additive may be an aprotic, electron-rich material that is soluble in the second organic solvent. For instance, the crystallization additive may be an olefin, a polyolefin, an anisole, a polydimethyl siloxane, a tertiary amine, an aliphatic or aromatic ether, or mixtures thereof. The olefin may include, but is not limited to, squalene, cyclododecatriene, norbornylene, norbornadiene, a phenyl terminated polybutadiene, and mixtures thereof. The anisole may include, but is not limited to, 2,4-dimethyl anisole, 3,5-dimethyl anisole, 2,6-dimethyl anisole, and mixtures thereof. These compounds are commercially available from various manufacturers, such as from Sigma-Aldrich Co. (St. Louis, Mo.). In one embodiment, the crystallization additive is polydimethyl siloxane. The crystallization additive, which is in solution in the second organic solvent, may be used to form a crystallization solution that includes the partially hydrolyzed ether/alane-ether complex solution. Alternatively, the crystallization solution may be formed by adding the crystallization additive to the partially hydrolyzed ether/alane-ether complex solution.

Seed crystals of α-alane may optionally be added during the crystallization to promote the growth of the α-alane. The seed crystals may subsequently be incorporated into the α-alane.

To desolvate and crystallize the α polymorph, the ether may be removed from the crystallization solution, such as by distilling the ether. To remove the ether, the crystallization solution may be heated at ambient or reduced pressure. For instance, if the ether is removed under vacuum, the crystallization solution may be heated at a temperature ranging from approximately 50° C. to approximately 60° C. However, if the ether is removed at ambient pressure, a temperature ranging from approximately 80° C. to approximately 100° C., such as from approximately 80° C. to approximately 97° C., may be used. A rate at which the ether is removed may affect the formation of the α-alane. If the ether is removed too quickly, the alane-ether complex may precipitate from the crystallization solution rather than forming the crystals of the α-alane. However, if the ether is removed too slowly, the crystallization process may be too long for practical and economical purposes. In one embodiment, the ether is removed by heating the crystallization solution to a temperature ranging from approximately 80° C. to approximately 95° C.

Multiple heating cycles and subsequent dilutions with additional ether may be used to crystallize the α polymorph. The amount of ether in the crystallization solution may initially be reduced to less than approximately 10% by volume by heating the crystallization solution to a temperature ranging from approximately 80° C. to approximately 87° C., such as from approximately 82° C. to approximately 85° C. The remaining volume of the crystallization solution may then be heated until a precipitate is formed.

At an initial point in the distillation, spherical particles of the alane-ether complex may be present. It is believed that these spherical particles are not crystals but are crystalline. However, as the ether is distilled, crystals of the alane may begin to form. The crystals formed initially may have a needlelike morphology, indicating formation of the α' polymorph. After the α' polymorph forms, additional ether may be added to the growing crystals. The additional ether may be removed by heating to a temperature ranging from approximately 88° C. to approximately 95° C., such as from approximately 88° C. to approximately 92° C. After removing the additional ether, the crystals may have a cubic or rhombohedral appearance, indicating formation of the α polymorph. Without being bound to a particular theory, it is believed that the α' polymorph crystals may transform to crystals of the a polymorph upon heating and during distillation of the ether. The formation of the different morphologies of the crystals may be observed by visual microscopy, such as by scanning electron microscopy ("SEM") or optical microscopy.

After substantially all of the ether has been removed, the crystals may be filtered to remove any remaining toluene and seed crystals that may be present, leaving the crystals of α-alane wetted with ether and toluene. The α-alane crystals may be washed with an aqueous acidic solution to remove any impurities, such as at least one of aluminum (formed by pyrolysis), the α' polymorph, lithium chloride, LAH, and other undesirable polymorphs. The acidic solution may include from approximately 1% by volume to approximately 25% by volume of an acid, such as HCl, hydrofluoric acid, hydrobromic acid, phosphoric acid, perchloric acid, sulfuric acid, boric acid, or mixtures thereof. In one embodiment, the acidic solution includes from approximately 10% by volume to approximately 12% by volume of HCl. The crystals of the α-alane may then be filtered to remove the acidic solution. The α-alane crystals may be rinsed with water to remove remaining trace amounts of the acidic solution, followed by rinses with acetone or isopropanol to remove the water. The α-alane crystals may then be dried.

Without being bound to a particular theory, it is believed that the α polymorph nucleates and forms by conversion of the α' polymorph or another needlelike polymorph. However, the presence of needlelike polymorphs during the crystallization is not a necessary or sufficient condition for formation of the α polymorph. The crystallization additive may also promote growth of the α polymorph by providing a nucleation site for the α polymorph. The crystallization additive may also suppress formation of the undesirable polymorphs. It is also believed that early precipitation of the crystals may promote the growth of the α polymorph.

The α-alane produced by the method of the present invention may include an amount of carbon that ranges from approximately 0.15% to less than approximately 1%, such as from approximately 0.15% to approximately 0.25%. The amount of hydrogen in the α-alane may range from approximately 9.5% to approximately 10.2%, such as from approximately 9.9% to approximately 10.1%. Trace amounts of nitrogen may also be present. The α-alane produced by the method of the present invention may have a particle (crystallite) size ranging from approximately 5 microns to approximately 100 microns. The α-alane may have a density at room temperature that ranges from approximately 1.47 g/cc to approximately 1.49 g/cc. The α-alane may also be substantially free of trace elements, such as chloride ions. For instance, the chloride ions may be present in the α-alane in an amount of less than approximately 0.05 wt %. The α-alane may be substantially free of other alane polymorphs, such as having greater than or equal to approximately 90% of the α polymorph. A high yield of the α-alane may also be achieved. The yield of α-alane obtained by the method of the present invention may range from approximately 20% to approximately 60% based on the aluminum chloride, such as from approximately 50% to approximately 60% based on the aluminum chloride.

Since borohydride salts are not used, the method of the present invention provides a low-cost, high-performing method of producing α-alane. The method also produces a high yield of α-alane that is substantially free of other polymorphs. As such, the α-alane may be of improved quality and may be reproducibly synthesized.

The α-alane may be used to formulate energetic materials, such as explosive compositions, propellant compositions, or pyrotechnic compositions. In addition to using the α-alane as a fuel, the energetic material may include at least one of a binder, an oxidizer, and an additional fuel. The binder may be a conventional binder or filler material including, but not limited to, a polyoxetane, a polyglycidyl azide, a polybutadiene, a polybutadieneacrylonitrileacrylic acid terpolymer, a polyether, a polyglycidyl nitrate, a polycaprolactone, or mixtures thereof. Energetic or non-energetic polymers may also be used. Examples of the energetic or non-energetic polymers include, but are not limited to, a cellulosic polymer, such as cellulose acetate butyrate ("CAB") or nitrocellulose, a nylon, a polyester, a fluoropolymer, an energetic oxetane, a wax, and copolymers thereof. The oxidizer may include, but is not limited to, trinitrotoluene ("TNT"), cyclo-1,3,5-trimethylene-2,4,6-trinitramine ("RDX"), cyclotetramethylene tetranitramine ("HMX"), hexanitrohexaazaisowurtzitane ("CL-20"), 4,10-dinitro-2,6,8,12-tetraoxa-4,10-diazatetracyclo-[5.5.0.0$^{5,9}$.0$^{3,11}$]-dodecane ("TEX"), 1,3,3-trinitroazetine ("TNAZ"), ammonium perchlorate ("AP"), potassium perchlorate ("KP"), ammonium dinitramide ("ADN"), potassium dinitramide ("KDN"), sodium peroxide ("$Na_2O_2$"), sodium nitrate ("SN"), potassium nitrate ("KN"), ammonium nitrate ("AN"), 2,4,6-trinitro-1,3,5-benzenetriamine ("TATB"), dinitrotoluene ("DNT"); and mixtures thereof. The additional fuel may be a metallic fuel, such as aluminum, beryllium, boron, magnesium, zirconium, mixtures thereof, or alloys thereof. The energetic material may also include other conventional ingredients, such as at least one of a plasticizer, a burn rate modifier, and a ballistic additive.

The α-alane may also be used for hydrogen storage, such as providing a hydrogen source in fuel cells or batteries. The α-alane may be formulated into a composition that provides a controlled release of hydrogen in the fuel cell or battery.

The α-alane may also be used as a chemical reducing agent. As the reducing agent in chemical reactions, the α-alane may function as a hydride donor to reduce carbon—carbon double bonds or triple bonds or to reduce carbonyl moieties, such as ketones, aldehydes, carboxylic acids, esters, amides, and acid chlorides. The α-alane may also be used as a polymerization catalyst to catalyze addition polymerization reactions, such as the polymerization of olefin monomers or vinyl monomers.

To provide additional stability, the α-alane may be stabilized with polyhydric monomers and polymers, such as aluminon (aurintricarboxylic acid triammonium salt), 8-hydroxyquinoline, or catechol.

EXAMPLES

Example 1

Synthesis of α-alane (10 gram scale)

To a dry, 2-L round-bottom flask, 420 ml of anhydrous diethyl ether was added under an inert atmosphere and cooled to −10° C. Aluminum trichloride (12.8 g) was added to the anhydrous diethyl ether, taking care to not introduce moisture. A 1M LAH solution (440 ml) was transferred to an addition funnel using a cannula and was added dropwise to the solution of the aluminum trichloride in the diethyl ether. The aluminum chloride and the LAH were reacted to form the alane-ether complex. The temperature of the reaction was controlled by adjusting the rate at which the LAH solution was added. The temperature of the reaction was not allowed to rise above 0° C. When the reaction had cooled down to from −8° C. to −10° C., 19 ml of diethyl ether was added by syringe. The diethyl ether had been previously saturated with water. The resulting suspension was stirred for approximately 15 minutes. The suspension was then filtered through a Neutch filter, under an inert atmosphere, into a clean, dry container and was maintained at a temperature of below 0° C.

In a 12-L reactor having a dry addition funnel, a distillation apparatus, and a thermocouple, 5-L of anhydrous toluene was added under an inert atmosphere using a cannula. In addition, 3 ml of polydimethyl siloxane having a viscosity of 1 centistoke ("cSt") and 100 mg of seed crystals were added to the reactor. The solution of toluene, polydimethyl siloxane, and the seed crystals was heated to 92° C. The solution including the alane-etherate complex, produced as described above, was transferred to the addition funnel using a cannula and was added to the reactor. The addition of the alane-etherate complex solution from the addition funnel was completed in approximately one hour, taking care that the rate of addition was not so rapid that the temperature dropped below 88° C. The diethyl ether from the alane-etherate complex solution was removed by distillation and collected in a 1-L addition funnel attached to a 1-L round-bottom flask. The reaction was continued for approximately one hour, until most of the diethyl ether was recovered.

The reaction was then cooled to 40° C. with a cooling bath. Approximately 500 ml of a 10% HCl solution was added very slowly to the reactor with a rapid nitrogen or argon purge. The HCl solution was added at such a rate that the reaction did not foam out of the reactor. When all gas evolution had stopped, the resulting suspension was discharged from the reactor into an Erlenmeyer flask and filtered on a glass frit. After filtering, the solid α-alane crystals were rinsed with water to remove the HCl. A rinse of acetone or isopropanol was used to remove the water before drying the α-alane crystals.

Example 2

Effect of Borohydride Salts on the Production of α-alane

Experiments were conducted in which borohydride salts, such as lithium borohydride or sodium borohydride, were used. The experiments showed that the borohydride salts did not influence the course of the reaction because the reaction proceeded similarly in the absence and the presence of the borohydride salts.

The experiments conducted in the absence of the borohydride salts indicated that the borohydride salts are not necessary to produce the α-alane, which is contrary to the teachings of known methods of producing α-alane. By eliminating the need for the borohydride salts, the production of the α-alane is cheaper and generates fewer byproducts that need to be disposed of.

Example 3

Synthesis of α-alane Utiziling a Mixed Solvent System and Polydimethylsiloxane

To a dry, sealed, 3-L 3-neck round-bottom flask having an argon purge and an overhead stirrer, 100.5 ml of anhydrous ether and 210 ml of anhydrous toluene were added. Using an ice/acetone bath, the mixture was cooled to −10° C. With the argon purge across the open neck, 44.25 g of aluminum chloride was added slowly enough that the temperature did not rise above 5° C. and no ether vapors were produced. In a separate, dry, sealed 2-L round-bottom flask equipped with an argon purge at ambient temperature, 500 ml of 2.4M LAH in diethyl ether, 700 ml of anhydrous ether, and 300 ml of anhydrous toluene were combined, respectively. The ice bath was removed from the aluminum chloride solution. Using a cannula, the LAH mixture was transferred into the 3-L round-bottom flask containing the aluminum chloride solution. Since the reaction was exothermic, the temperature was maintained at approximately 20° C. with intermittent cooling as needed. The mixture was stirred for 10 minutes and then allowed to sit so that solids settled to the bottom.

In a dry, sealed 12-L jacketed reactor equipped with an overhead stirrer, an argon purge, and a distillation apparatus, 5 L of anhydrous toluene and 7.5 ml of polydimethylsiloxane (1 cSt) were added. The mixture was heated to 95° C. Using a dry siphon tube, the etherate solution from the 3-L round-bottom flask was transferred into the reactor, below the surface of the toluene, leaving behind the solids in the 3-L round-bottom flask. The alane precipitated immediately upon addition, along with distillation of the ether. Approximately 85% of the ether was distilled. The reaction was stirred for one hour or until enough ether was collected.

Upon completion of the crystallization, the reactor contents were cooled to 30° C.-35° C. To quench the reaction, a 10% HCl solution was added drop-wise at first with a liberal argon purge, keeping the temperature below 50° C. At least 1 L of the 10% HCl solution was used to complete the quench. The mixture was stirred for 45–60 minutes at approximately 35° C. before separating the aqueous layer (containing the α-alane) and the organic layer. The aqueous layer was drained into a 4-L Erlenmeyer flask containing 1.5 L of ice water. The organic layer was disposed of. The solid was filtered and washed liberally with water, isopropyl alcohol, and ether, respectively. The solid was dried under vacuum at room temperature with a slight nitrogen purge. The reaction yielded approximately 25 g of α-alane as small cubic-shaped crystals.

Example 4

Synthesis of α-alane Utiziling a Mixed Solvent System, Water, and Polydimethylsiloxane In a dry, sealed 250-ml 3-neck round-bottom flask equipped with an argon purge and an overhead stirrer, 5 ml of anhydrous ether and 10.5 ml of anhydrous toluene were added. Using an ice/acetone bath, the mixture was cooled to −10° C. With the argon purge across the open neck, 2.2 g of aluminum chloride was added slowly enough that the temperature did not rise above 5° C. and no ether vapors were produced. In a separate, dry, sealed 100-ml flask with an argon purge at ambient temperature, 60 ml of 1M LAH and 15 ml of anhydrous toluene were combined, respectively. After transferring the LAH solution, 3.5 ml of diethyl ether previously saturated with water was added at room temperature. The ice bath was removed from the aluminum chloride solution. Using a cannula, the LAH solution was transferred into the 250-ml round-bottom flask containing the aluminum chloride solution. The reaction was exothermic and was maintained at approximately 20° C. with intermittent cooling as needed. The mixture was stirred for 10 minutes and then allowed to sit so that solids settled to the bottom.

In a dry, sealed 500-ml reactor equipped with an overhead stirrer, an argon purge, a silicon oil heating bath, and a distillation apparatus, 250 ml of anhydrous toluene and 0.375 ml of polydimethylsiloxane (1 cSt) were added. The mixture was heated to 95° C. Using a dry siphon tube, the etherate solution from the 250-ml round-bottom flask was transferred into the reactor, below the surface of the toluene, leaving behind the solids in the 250-ml round-bottom flask. The alane precipitated immediately upon addition, along with distillation of the ether. Approximately 85% of the ether was distilled. The reaction was stirred for one hour or until enough ether was collected.

Upon completion of the crystallization, the reactor contents were cooled to 30° C.–35° C. To quench the reaction, a 10% HCl solution was added drop-wise at first with a liberal argon purge, keeping the temperature below 50° C. At least 25 ml of the 10% HCl solution was used to complete the quench. The mixture was stirred for 45–60 minutes at approximately 35° C. before separating the aqueous layer (containing the α-alane) and the organic layer. The aqueous layer was drained into an Erlenmeyer flask containing 50 ml of ice water. The organic layer was disposed of. The solid was filtered and washed liberally with water, isopropyl alcohol, and ether, respectively. The solid was dried under vacuum at room temperature with a slight nitrogen purge. The reaction yielded 1.25 g of α-alane. The α-alane prepared by this method produced larger crystals with more of a hexagonal habit than the method not using the partially hydrolyzed alane-ether solution.

Example 5

Synthesis of α-alane Utiziling a Mixed Solvent System and Polydimethylsiloxane

The experimental conditions utilized in Example 4 were repeated, except that the water was omitted from the process.

To a dry, sealed 250-ml 3-neck round-bottom flask equipped with an argon purge and an overhead stirrer, 6 ml of anhydrous ether and 2.8 ml of anhydrous toluene were added. Using an ice/acetone bath, the mixture was cooled to −10° C. With the argon purge across the open neck, 2.66 g of aluminum chloride was added slowly enough that the temperature did not rise above 5° C. and no ether vapors were produced. In a separate, dry, sealed 150-ml flask with an argon purge at ambient temperature, 72 ml 1M of LAH and 30 ml of anhydrous toluene were combined, respectively. The ice bath was removed from the aluminum chloride solution. Using a cannula, the LAH mixture was transferred into the 250-ml round-bottom flask containing the aluminum chloride solution. The reaction was exothermic and was maintained at approximately 20° C. with intermittent cooling as needed. The mixture was stirred for 10 minutes and then allowed to sit so that solids settled to the bottom.

In a dry, sealed 500-ml reactor equipped with an overhead stirrer, an argon purge, a silicon oil heating bath, and a distillation apparatus, 250 ml of anhydrous toluene and 0.5 ml of polydimethylsiloxane (1 cSt) were added. The mixture was heated to 95° C. Using a dry siphon tube, the etherate solution from the 250-ml round-bottom flask was transferred into the reactor, below the surface of the toluene, leaving behind the solids in the 250-ml round-bottom flask. The alane precipitated immediately upon addition, along with distillation of the ether. Approximately 85% of the ether was distilled. The reaction was stirred for one hour or until enough ether was collected.

Upon completion of the crystallization, the reactor contents were cooled to 30° C.–35° C. To quench the reaction, a 10% HCl solution was added drop-wise at first with a liberal argon purge, keeping the temperature below 50° C. At least 25 ml of the 10% HCl solution was used to complete the quench. The mixture was stirred for 45–60 minutes at approximately 35° C. before separating the aqueous layer (containing the α-alane) and the organic layer. The aqueous layer was drained into an Erlenmeyer flask containing 50 ml of ice water. The organic layer was disposed of. The solid was filtered and washed liberally with water, isopropyl alcohol, and ether, respectively. The solid was dried under vacuum at room temperature with a slight nitrogen purge. The reaction yielded 1.23 g of α-alane as small (about 10 micron diameter) cubic crystals.

While the invention may be susceptible to various modifications and alternative forms, specific embodiments have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of producing α-alane, comprising:
   reacting aluminum trichloride and an alkali metal hydride to form an alane-ether complex solution;
   adding an aqueous ether solution to the alane-ether complex solution to form a partially hydrolyzed ether/alane-ether complex solution;
   adding a solution that comprises at least one crystallization additive to the partially hydrolyzed ether/alane-ether complex solution to form a crystallization solution; and
   crystallizing α-alane from the crystallization solution.

2. The method of claim 1, wherein reacting the aluminum trichloride and the alkali metal hydride to form the alane-ether complex solution comprises reacting the aluminum trichloride and the alkali metal hydride in diethyl ether or in a mixed solvent system comprising greater than approximately 50% diethyl ether.

3. The method of claim 1, wherein reacting the aluminum trichloride and the alkali metal hydride to form the alane-ether complex solution comprises reacting an alkali metal hydride selected from the group consisting of lithium hydride, sodium hydride, potassium hydride, calcium hydride, magnesium hydride, lithium aluminum hydride, sodium aluminum hydride, and mixtures thereof with the aluminum trichloride.

4. The method of claim 1, wherein adding the aqueous ether solution to the alane-ether complex solution to form the partially hydrolyzed ether/alane-ether complex solution comprises adding an aqueous ether solution comprising from approximately 0.5% by volume to approximately 4% by volume of water to the alane-ether complex solution.

5. The method of claim 1, wherein adding the solution that comprises at least one crystallization additive to the partially hydrolyzed ether/alane-ether complex solution to form the crystallization solution comprises adding the partially hydrolyzed ether/alane-ether complex solution to the at least one crystallization additive dissolved in toluene.

6. The method of claim 1, wherein adding the solution that comprises at least one crystallization additive to the partially hydrolyzed ether/alane-ether complex solution to form the crystallization solution comprises combining the partially hydrolyzed ether/alane-ether complex solution with a solution that comprises the at least one crystallization additive selected from the group consisting of squalene, cyclododecatriene, norbornylene, norbornadiene, a phenyl terminated polybutadiene, 2,4-dimethyl anisole, 3,5-dimethyl anisole, 2,6-dimethyl anisole, polydimethyl siloxane, and mixtures thereof.

7. The method of claim 1, wherein adding the solution that comprises at least one crystallization additive to the partially hydrolyzed ether/alane-ether complex solution to form the crystallization solution comprises formulating the crystallization solution to be free of an alkali metal borohydride.

8. The method of claim 1, wherein crystallizing the α-alane from the crystallization solution comprises removing ether from the crystallization solution.

9. The method of claim 1, wherein crystallizing the α-alane from the crystallization solution comprises heating the crystallization solution to a temperature ranging from approximately 80° C. to approximately 97° C. to reduce a volume of ether in the crystallization solution to less than approximately 10% by volume.

10. The method of claim 9, further comprising adding additional ether to the crystallization solution after reducing the volume of ether in the crystallization solution to less than approximately 10% by volume and heating the additional ether and the crystallization solution to a temperature ranging from approximately 88° C. to approximately 95° C. to produce the α-alane.

11. The method of claim 1, further comprising exposing the α-alane to an acidic solution comprising from approximately 10% by volume to approximately 12% by volume of hydrochloric acid.

12. A method of producing α-alane, comprising:
   reacting aluminum trichloride and an alkali metal hydride to form an alane-ether complex solution;
   adding an aqueous ether solution to the alane-ether complex solution to form a partially hydrolyzed ether/alane-ether complex solution;
   adding a solution that comprises at least one crystallization additive to the partially hydrolyzed ether/alane-ether complex solution to form a crystallization solution, wherein the crystallization solution is free of an alkali metal borohydride; and
   crystallizing α-alane from the crystallization solution.

13. A method of producing α-alane, comprising:
   reacting aluminum trichloride and an alkali metal hydride to form an alane-ether complex solution;
   combining the alane-ether complex solution with a solution that comprises at least one crystallization additive to form a crystallization solution, wherein the at least one crystallization additive is selected from the group consisting of squalene, cyclododecatriene, norbornylene, norbornadiene, polydimethyl siloxane, and mixtures thereof; and
   crystallizing α-alane from the crystallization solution.

14. The method of claim 13, wherein reacting the aluminum trichloride and the alkali metal hydride to form the alane-ether complex solution comprises reacting an aluminum trichloride and the alkali metal hydride in diethyl ether or in a mixed solvent system comprising greater than approximately 50% diethyl ether.

15. The method of claim 13, wherein reacting the aluminum trichloride and the alkali metal hydride to form the alane-ether complex solution comprises reacting the alkali metal hydride selected from the group consisting of lithium hydride, sodium hydride, potassium hydride, calcium hydride, magnesium hydride, lithium aluminum hydride, sodium aluminum hydride, and mixtures thereof with the aluminum trichloride.

16. The method of claim 13, wherein combining the alane-ether complex solution with the solution that comprises the at least one crystallization additive to form the crystallization solution comprises combining the alane-ether complex solution with a solution that comprises from approximately 0.05% by weight to approximately 5% by weight of the at least one crystallization additive.

17. The method of claim 13, wherein combining the alane-ether complex solution with the solution that comprises the at least one crystallization additive to form the crystallization solution comprises combining the alane-ether complex solution with the at least one crystallization additive dissolved in toluene.

18. The method of claim 13, wherein combining the alane-ether complex solution with the solution that comprises the at least one crystallization additive to form the crystallization solution comprises formulating the crystallization solution to be free of an alkali metal borohydride.

19. The method of claim 13, wherein crystallizing the α-alane from the crystallization solution comprises removing ether from the crystallization solution.

20. The method of claim 13, wherein crystallizing the α-alane from the crystallization solution comprises heating the crystallization solution to a temperature ranging from approximately 80° C. to approximately 97° C. to reduce a volume of ether in the crystallization solution to less than approximately 10% by volume.

21. The method of claim 20, further comprising adding additional ether to the crystallization solution after reducing the volume of ether in the crystallization solution to less than approximately 10% by volume and heating the additional ether and the crystallization solution to a temperature ranging from approximately 88° C. to approximately 95° C. to produce the α-alane.

22. The method of claim 13, further comprising exposing the α-alane to an acidic solution comprising from approximately 10% by volume to approximately 12% by volume of hydrochloric acid.

* * * * *

UNITED STATES PATENT AND TRADEMARK OFFICE
CERTIFICATE OF CORRECTION

PATENT NO. : 6,984,746 B2  Page 1 of 1
APPLICATION NO. : 10/947078
DATED : January 10, 2006
INVENTOR(S) : Gary K. Lund, Jami M. Hanks and Harold E. Johnston It is certified that error appears in the above-identified patent and that said Letters Patent is hereby corrected as shown below:

COLUMN 3,   LINE 21,   change "a" to --α--
COLUMN 8,   LINE 40,   change "Utiziling" to --Utilizing--
COLUMN 9,   LINE 22,   change "Utiziling" to --Utilizing--
COLUMN 10,  LINE 11,   change "Utiziling" to --Utilizing--

Signed and Sealed this

Twentieth Day of January, 2009

JON W. DUDAS
*Director of the United States Patent and Trademark Office*